United States Patent [19]

Miner

[11] Patent Number: 5,087,991
[45] Date of Patent: Feb. 11, 1992

[54] MULTI-IMAGE VIEWER APPARATUS

[75] Inventor: Mark D. Miner, Brooklyn Park, Minn.

[73] Assignee: InterNatural Designs, Inc., Minneapolis, Minn.

[21] Appl. No.: 611,544

[22] Filed: Nov. 13, 1990

[51] Int. Cl.⁵ .................................................. G02B 7/00
[52] U.S. Cl. ..................................... 359/894; 359/819; 359/831
[58] Field of Search ................ 350/252, 319, 286, 287, 350/451, 463

[56] References Cited

U.S. PATENT DOCUMENTS

| | | | |
|---|---|---|---|
| 4,097,818 | 6/1978 | Manonkian et al. | 359/831 |
| 4,818,067 | 4/1989 | Maisenbacher et al. | 359/819 |
| 4,892,399 | 1/1990 | Ahn | 359/831 |

Primary Examiner—Loha Ben
Attorney, Agent, or Firm—Palmaiter & Sjoquist

[57] ABSTRACT

An apparatus for multi-image viewing includes a first hollow eye piece housing having a first eye aperture and a concentric second equator aperture; and a second hollow lens housing having a third equator aperture and a concentric fourth lens mount aperture. A multifaceted disc-like, prismatic lens is seated within the lens mount housing in fixed relation to the lens mount aperture. The diameter of the outer periphery of the lens exceeds that of inner periphery of the lens mount aperture. The first hollow housing is permanently bonded to the second hollow housing at their equator apertures.

13 Claims, 1 Drawing Sheet

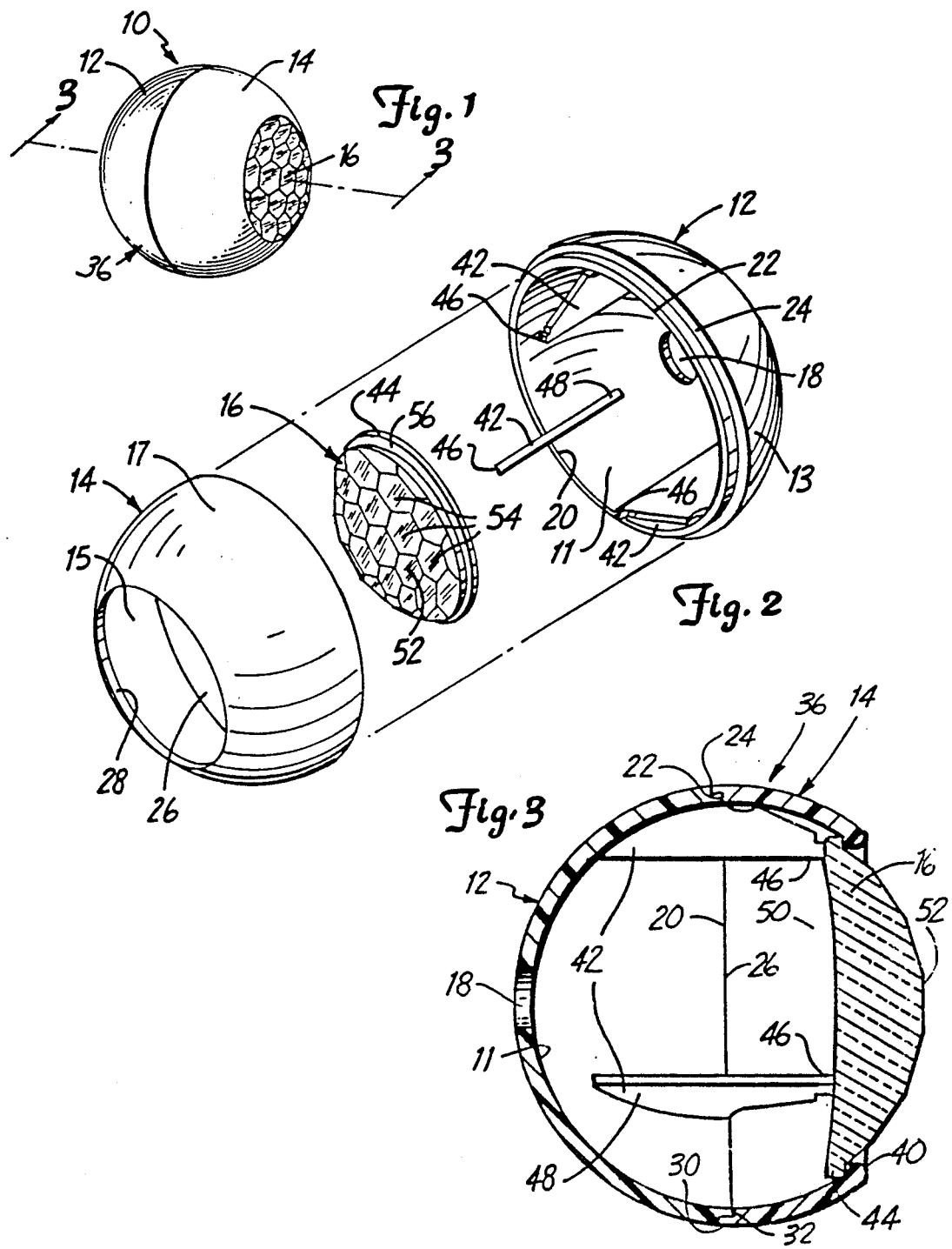

MULTI-IMAGE VIEWER APPARATUS

BACKGROUND OF THE INVENTION

The present invention relates to multi-image viewers, and in particular, it relates to multi-image viewer apparatus which can not be disassembled under normal circumstances.

Multi-image viewers are unique gadgets for viewing multi-images. The viewers operate by a person looking through one end of the multi-image viewers and observing multi-images of the objects being viewed. A multi-faceted prismatic lens opposite the viewing end of the multi-image viewers transforms a single viewed object into a multitude of images of the same object.

Prior art multi-image viewers have several distinct disadvantages. First, the prismatic lens of the prior art can be easily dislodged from the multi-image viewers such that a small child or infant can put the dislodged lens in his or her mouth and possibly swallow, or even choke on, the lens. Next, the viewers of the prior art have a viewing end, the part of the multi-image viewers a person looks through, which projects outward from the multi-image viewers such that the viewing end has the potential to cause injury to the eye of the person if the multi-image viewers are hit or bumped while a person is using it. The above outlined disadvantages in the prior art multi-image viewers have the potential to cause serious injury to not only a small child or infant, but to anyone else who may be using the prior multi-image viewers.

SUMMARY OF THE INVENTION

An apparatus for multi-image viewing includes a first hollow eye piece housing and a second hollow lens housing. The eye piece housing includes a first eye aperture and a concentric second equator aperture. The lens housing includes a third equator aperture and a concentric fourth lens mount aperture.

Connecting means are provided for connecting the housings to each other at their equator apertures.

A prismatic lens is seated within the second hollow housing adjacent the fourth aperture.

In the form of the invention as shown, the lens is circular in shape and has a diameter greater than the diameter of the fourth lens mount aperture.

As shown, a means to hold the lens adjacent the fourth aperture includes a plurality of legs projecting from the first hollow housing through the second and the third aperture and into the second hollow housing such that the lens is held against the lens rim by the legs. Also as shown, the connecting means preferably includes the first hollow housing being connected to the second hollow housing by sonic welding.

BRIEF DESCRIPTION OF THE DRAWINGS

FIG. 1 is a perspective view of the multi-image viewer apparatus of the present invention.

FIG. 2 is an exploded view of the multi-image viewer apparatus of FIG. 1.

FIG. 3 is a vertical sectional view taken along line 3—3 in FIG. 1.

DETAILED DESCRIPTION OF THE PREFERRED EMBODIMENTS

An apparatus for multi-image viewing 10 includes a first hollow eye piece housing 12, a second hollow lens housing 14 and a multi-faceted prismatic lens 16.

As seen in FIG. 2, the first hollow eye piece housing 12 is substantially hemispherical having a first inside surface 11 and a first outside surface 13. The eye piece housing 12 further incudes a first eye aperture 18 and a second equator aperture 20. The eye piece housing 12 has a first inner eye piece flange 22 projecting from its first inside surface 11 and located circumferentially around its second equator aperture 20. The projection of the first flange 22 creates an outer first eye piece ledge 24 between the first inside and first outside surfaces 11 and 13.

The second hollow lens housing 14 is substantially hemispherical having a second inside surface 15 and a second outside surface 17. The second hollow lens housing 14 further includes a third equator aperture 26 and a fourth lens mount aperture 28. As seen in FIG. 3, second hollow lens housing 14 has a second outer lens housing flange 30 projecting from the second outside surface 17 and located circumferentially around the third equator aperture 26. The projection of the second flange 30 creates a second inner ledge 32 between the second inside and second outside surfaces 15 and 17.

Both housings 12 and 14 are preferably constructed from A.B.S. plastic. However, many other materials will be suitable for this purpose.

As seen in FIG. 2, in the preferred embodiment, the first, second, third and fourth apertures 18, 20, 26 and 28 are each substantially circular. In addition, second and third apertures 20 and 26 have substantially equal diameters. Furthermore, fourth aperture 28 has a diameter less than the diameter of each of the second and third apertures 20 and 26 and the first aperture 18 has a diameter less than the diameter of the fourth aperture 28.

The prismatic lens 16 is generally circular and has a very slightly concave inside surface 50 and a convex outside surface 52 more or less congruent with the second outside surface 17 of the second hollow housing 14 when installed. The convex outside surface 52 includes a plurality of prismatic configurations or facets 54 completely blanketing it. The lens 16 includes an outer lens flange 44 which has an outer diameter greater than the diameter of the fourth aperture 28 so it cannot pass entirely through that aperture 28.

The lens flange 44 projects integrally and radially outwardly from lens 16, forming a lens ledge 56 on the side of flange 44 adjacent the convex outside surface 52 of the lens.

When assembled, the lens 16 is positioned adjacent the fourth aperture 28 and against the second inside surface 15 of the second hollow housing 14 as illustrated in FIG. 3.

The fourth lens mount aperture 28 includes an annular lens retaining rim 40. A holding means is provided for holding the lens 16 adjacent the fourth aperture 28. The holding means includes this annular lens retaining rim 40 mated to the lens flange 44. With lens 16 placed as seen in FIG. 3 and with lens flange 44 against lens rim 40 on the second inside surface 15 of second hollow housing 14, the lens ledge 56 is seated on the lens rims 40. In a preferred embodiment, an adhesive substance is applied to the lens flange 44 and the lens ledge 56 to securely hold the lens 16 adjacent the fourth aperture 28.

In addition, the holding means includes a plurality of legs 42 projecting from the first inside surface 11 of the first eye piece housing 12 through the second and the third equator apertures 20 and 26 and into the second hollow lens housing 14. The legs 42 each have a tip end portion 46 and a base portion 48. Each base portion 48 is integrally attached to the first inside surface 11 of the first hollow eye piece housing 12. The legs 42 are so positioned and constructed that the leg tip end portions 46 contact the lens 16 and hold it firmly against the lens rim 40.

As shown, the plurality of legs 42 includes three legs located equidistant from each other about the first inside surface 11 of the eye piece housing 12.

To connect the first hollow eye piece housing 12 to the second hollow lens mount housing 14, the first eye piece flange 22 and its ledge 24 are mated to the second lens housing ledge 32 and its second flange 30 to form a spherical main housing 36. The apparatus will then be subjected to a sonic welding process. This sonic welding subjects the surface molecules of all mutually contacting surfaces to a sonic frequency thereby agitating the molecules of each such that adjacent molecules are bonded or welded to each other. Other ways of permanently bonding the various parts to each other can also be effective.

The present design of the apparatus 10 tends to make the invention "child safe". First, the lens 16 has an outer diameter greater than the diameter of the fourth aperture 28 such that even if the lens 16 is separated from the fourth aperture 28, the lens 16 can not escape from within the main housing 36. Thus, whether separation of the lens from the lens mount occurs accidentally or by the actions of a curious child; and whether this occurs because of failure of the bond between lens flange 44 and lens retaining rim 40 or by fracture of one or more of legs 42, or both, the lens 16 still cannot escape from within the main housing 36. By maintaining the lens 16 within the main housing 36, the lens 16 will not be able to be swallowed or choked on by a small child or infant.

It is now accepted that an object having a minimum dimension of one and one-half inches is too large to cause choking even if purposefully put into the mouth. In fact, it is only with substantial difficulty that a spherical object such as apparatus 10 having a diameter of one and one-half inches can even be forced between the teeth of a fully grown adult, let alone positioned so as to block the airway to the throat. When the outer diameter of the spherical main housing 36 is maintained at no less than one and one-half inches, this prevents small children or infants from placing the apparatus 10 within their mouths thereby preventing the swallowing of or choking on the apparatus 10.

The first eye aperture 18 of eye piece housing 12 is the aperture a person looks through in order to view multi-images through the lens 16. This structure replaces the standard eye piece on conventional, generally funnel-shape, prior art multi-image viewers. There will be less of a chance of injury to a child or infant using the apparatus of the invention since there is not an eye piece which projects from the multi-image viewer. A projecting eye piece has the potential to be accidentally jabbed into the eye of a child or infant thereby causing injury to the child or infant.

Although the present invention has been described with reference to preferred embodiments, workers skilled in the art will recognize that changes may be made in form and detail without departing from the spirit and scope of the invention.

What is claimed is:

1. An apparatus for multi-image viewing, the apparatus including:
   a first hollow eye piece housing having a first eye aperture and a second equator aperture concentric with first eye aperture;
   a second hollow lens housing having a third equator aperture and a fourth lens mount aperture concentric with the third equator aperture;
   connecting means for connecting the first hollow housing to the second hollow housing at the second and third apertures;
   a prismatic lens seated within the second hollow housing adjacent the fourth aperture; and
   holding means for holding the lens adjacent the fourth aperture.

2. The apparatus of claim 1, wherein the first hollow housing has a first flange and a first ledge located circumferentially around the second aperture, the second hollow housing having a second flange and a second ledge located circumferentially around the third aperture, and wherein the first flange is seated against the second ledge and the second flange is seated against the first ledge when the housings are connected to each other.

3. The apparatus of claim 1, wherein the first and the second hollow housings are each substantially hemispherical whereby upon connection of the first and the second hollow housings, a substantially spherical main housing is formed.

4. The apparatus of claim 3, wherein the first, the second, the third and the fourth apertures are each substantially circular, the second and the third apertures having substantially equal diameters.

5. The apparatus of claim 4, wherein the diameter of the fourth aperture is less than that of the second and third apertures, the diameter of the first aperture is less than that of the fourth aperture and the outer diameter of the lens is greater than that of the fourth aperture and is less than that of the second and third apertures.

6. The apparatus of claim 5, wherein the second hollow housing further includes a lens rim located circumferentially around the fourth aperture, the lens being seated against the lens rim.

7. The apparatus of claim 6, wherein the means for holding includes adhesive connecting the lens to the second hollow housing adjacent the fourth aperture.

8. The apparatus of claim 7, wherein the means for holding further includes a plurality of legs projecting from the first hollow housing through the second and the third apertures and into the second hollow housing, the legs further holding the lens against the second hollow housing.

9. The apparatus of claim 8, wherein the plurality of legs includes three legs.

10. The apparatus of claim 8, wherein the legs are integral to the first hollow housing.

11. The apparatus of claim 1, wherein the connecting means includes a joint connecting the first hollow housing to the second hollow housing by sonic welding.

12. The apparatus of claim 1, wherein the first and second hollow housings are each formed from A.B.S. plastic.

13. The apparatus of claim 1, wherein the maximum dimension across the fourth aperture is less than the maximum dimension across either of the second and third apertures, the minimum dimension across the lens is greater than the maximum dimension across the fourth aperture, and the maximum dimension across the first aperture is less than the maximum dimension across the lens.

* * * * *